United States Patent
Yamakado et al.

(10) Patent No.: US 7,038,808 B2
(45) Date of Patent: May 2, 2006

(54) PRINT CONTROL METHOD FOR A TANDEM PRINTING SYSTEM

(75) Inventors: Takeshi Yamakado, Kawasaki (JP); Tamotsu Nishiura, Kawasaki (JP); Keiju Takizawa, Yokohama (JP)

(73) Assignee: Fuji Xerox Co., Ltd., Tokyo (JP)

(*) Notice: Subject to any disclaimer, the term of this patent is extended or adjusted under 35 U.S.C. 154(b) by 1001 days.

(21) Appl. No.: 09/811,510

(22) Filed: Mar. 20, 2001

(65) Prior Publication Data
US 2002/0015177 A1 Feb. 7, 2002

(30) Foreign Application Priority Data
Aug. 3, 2000 (JP) .............................. 2000-236150

(51) Int. Cl.
G06F 3/12 (2006.01)
G06F 15/00 (2006.01)

(52) U.S. Cl. ..................................... 358/1.18; 358/1.15
(58) Field of Classification Search ......... 358/1.1–1.18
See application file for complete search history.

(56) References Cited

U.S. PATENT DOCUMENTS 5,752,776 A * 5/1998 Kunreuther .................. 400/82
6,219,516 B1 * 4/2001 Furst et al. ................. 399/301
6,476,923 B1 * 11/2002 Cornell ....................... 358/1.12

FOREIGN PATENT DOCUMENTS

| JP | 62-224821 | 10/1987 |
|----|-----------|---------|
| JP | 7-237336  | 9/1995  |
| JP | 11-231580 | 8/1999  |

* cited by examiner

Primary Examiner—Douglas Q. Tran
(74) Attorney, Agent, or Firm—Westerman, Hattori Daniels & Adrian, LLP

(57) ABSTRACT

A print control method for a tandem printing system having a host unit which supplies print data to a plurality of printers which are connected by a tandem-connection, includes the step of controlling synchronous operations of the plurality of printers by a single tandem control unit which is operable independently of the host unit and is provided independently of the plurality of printers.

20 Claims, 11 Drawing Sheets

PRINT CONTROL METHOD FOR A TANDEM PRINTING SYSTEM

BACKGROUND OF THE INVENTION

This application claims the benefit of a Japanese Patent Application No. 2000-236150 filed Aug. 3, 2000, in the Japanese Patent Office, the disclosure of which is hereby incorporated by reference.

BACKGROUND OF THE INVENTION

1. Field of the Invention

The present invention generally relates to print control methods and tandem printing systems, and more particularly to a print control method for controlling a plurality of tandem-connected printers, and to a tandem printing system which is formed by the plurality of tandem-connected printers.

The tandem printing system is formed by a plurality of tandem-connected printers, and prints information on front and/or back sides of a continuous recording sheet. The tandem printing system is suited for making a large amount of prints at a high speed. By operating the plurality of tandem-connected printers in synchronism, it is possible to carry out a monochrome or color printing at a high speed. For example, by tandem connection of a printer which prints information on the front side of the continuous recording sheet and a printer which prints information on the back side of the continuous recording sheet, it is possible to carry out a duplex printing which prints on both the front and back sides of the continuous recording sheet at a high speed. In addition, by tandem connection of four printers exclusively for printing in yellow (Y), magenta (M), cyan (C) and black (K), it is possible to make color prints at a high speed.

2. Description of the Related Art

In the tandem printing system described above, it is extremely important to operate the plurality of tandem-connected printers in synchronism. If the printers do not operate in synchronism, a color error may be generated in the case of the color printing, and a page continuity may be lost by an error in the printed contents on the front and back sides in the case of the duplex printing. In addition, the continuous recording sheet may be damaged if a slack or margin of the continuous recording sheet between two adjacent printers is too large or too small.

A first example of the conventional tandem printing system is shown in FIG. 1 of a Japanese Laid-Open Patent Application No. 62-224821, FIG. 10 of a Japanese Laid-Open Patent Application No. 7-237336, and FIG. 3 of a Japanese Laid-Open Patent Application No. 11-231580. According to this first example of the tandem printing system, a host unit is connected to a controller of each of the printers, and the supply of print commands and print data to each of the printers and the management of operating states of each of the printers are carried out by the host unit. In addition, the controllers of each of the printers are connected via signal lines which exchange information necessary to operate the printers in synchronism with each other.

In addition, a second example of the conventional tandem printing system is shown in FIG. 2 of the Japanese Laid-Open Patent Application No. 11-231580. According to this second example of the tandem printing system, a host unit is connected to a master printer and slave printers, and the supply of print commands and print data to each of the printers and the management of operating states of each of the printers are carried out by the host unit. Moreover, controllers of each of the printers are connected via signal lines and a common print controller within the master printer, and information necessary to operate the printers in synchronism with each other is exchanged primarily under control of the master printer.

In the case of the tandem printing system shown in FIG. 1 of the Japanese Laid-Open Patent Application No. 62-224821, the information necessary to operate the printers in synchronism with each other is exchanged primarily under control of the controller of one printer, and this tandem printing system is similar to the second example of the tandem printing system in that one printer operates as the master printer.

In the first example of the tandem printing system, the controllers of each of the printers must be connected by signal lines, and the connection of the printers by the signal lines becomes complex as the number of printers increases. In addition, since the controllers of each of the printers are connected by the signal lines, the controllers of each of the printers must have a construction connectable to the signal lines. In other words, the printers must be designed exclusively for the tandem printing system, and the existing printers which are designed to be used independently cannot be used to form the tandem printing system. As a result, the cost of the tandem printing system becomes high. Moreover, the host unit must be aware of the system structure every time a user modifies the system structure, thereby increasing the load on the host unit which must also manage the operating states of each of the printers.

On the other hand, in the second example of the tandem printing system, the load on the host unit is slightly reduced by the provision of the common print controller within the master printer. However, it is still necessary to connect each of the printers by the signal lines. In addition, because the constructions of the master printer and the slave printer are different, in order to form the tandem printing system, it is necessary to use at least two kinds of printers designed exclusively for the tandem printing system. Consequently, the cost of the tandem printing system becomes high compared to that of the first example of the tandem printing system described above. In addition, every time the user modifies the system structure of the tandem printing system, it is necessary to clearly define the relationships of the master printer and each of the slave printers, and the host unit must accurately be aware of the system structure of the tandem printing system, thereby increasing the load on the host unit which must also manage the operating states of each of the printers.

SUMMARY OF THE INVENTION

Accordingly, it is a general object of the present invention to provide a novel and useful print control method and tandem printing system, in which the problems described above are eliminated.

Another and more specific object of the present invention is to provide a print control method which can reduce the load on a host unit and positively operate a plurality of tandem-connected printers in synchronism, by centrally managing synchronous control of each of the printers by a control unit which can operate independently of the host unit, and to a tandem printing system which can be formed at a low cost basically by use of existing printers by employing such a print control method.

Still another object of the present invention is to provide a print control method for a tandem printing system having a host unit which supplies print data to a plurality of printers which are connected by a tandem-connection, comprising the step of controlling synchronous operations of the plurality of printers by a single tandem control unit which is operable independently of the host unit and is provided independently of the plurality of printers. According to the print control method of the present invention, it is possible to reduce the load on the host unit and positively operate the plurality of tandem-connected printers in synchronism, by centrally managing synchronous control of each of the printers by the tandem control unit which can operate independently of the host unit.

A further object of the present invention is to provide a tandem printing system comprising a plurality of printers connected by a tandem-connection and printing print data with respect to a continuous recording sheet, a host unit supplying the print data to the plurality of printers, and a single tandem control unit operable independently of the host unit and provided independently of the plurality of printers, where the tandem control unit includes means for controlling synchronous operations of the plurality of printers. According to the tandem printing system of the present invention, it is possible to form the tandem printing system at a low cost basically by use of existing printers by employing the print control method described above.

In the present invention, commands and/or status of the plurality of printers may be exchanged with the host unit by the tandem control unit. The plurality of printers may be controlled to carry out automatic loading of the continuous recording sheet in synchronism with each other by the tandem control unit. Further, a non-printing transport mode in which no printing is carried out and only transport of a continuous recording sheet is made, may be set with respect to one or a plurality of arbitrary printers of the plurality of printers.

Other objects and further features of the present invention will be apparent from the following detailed description when read in conjunction with the accompanying drawings.

DESCRIPTION OF THE PREFERRED EMBODIMENTS

Embodiments of a print control method according to the present invention and a tandem printing system according to the present invention will now be described with reference to the drawings.

Figure 1:
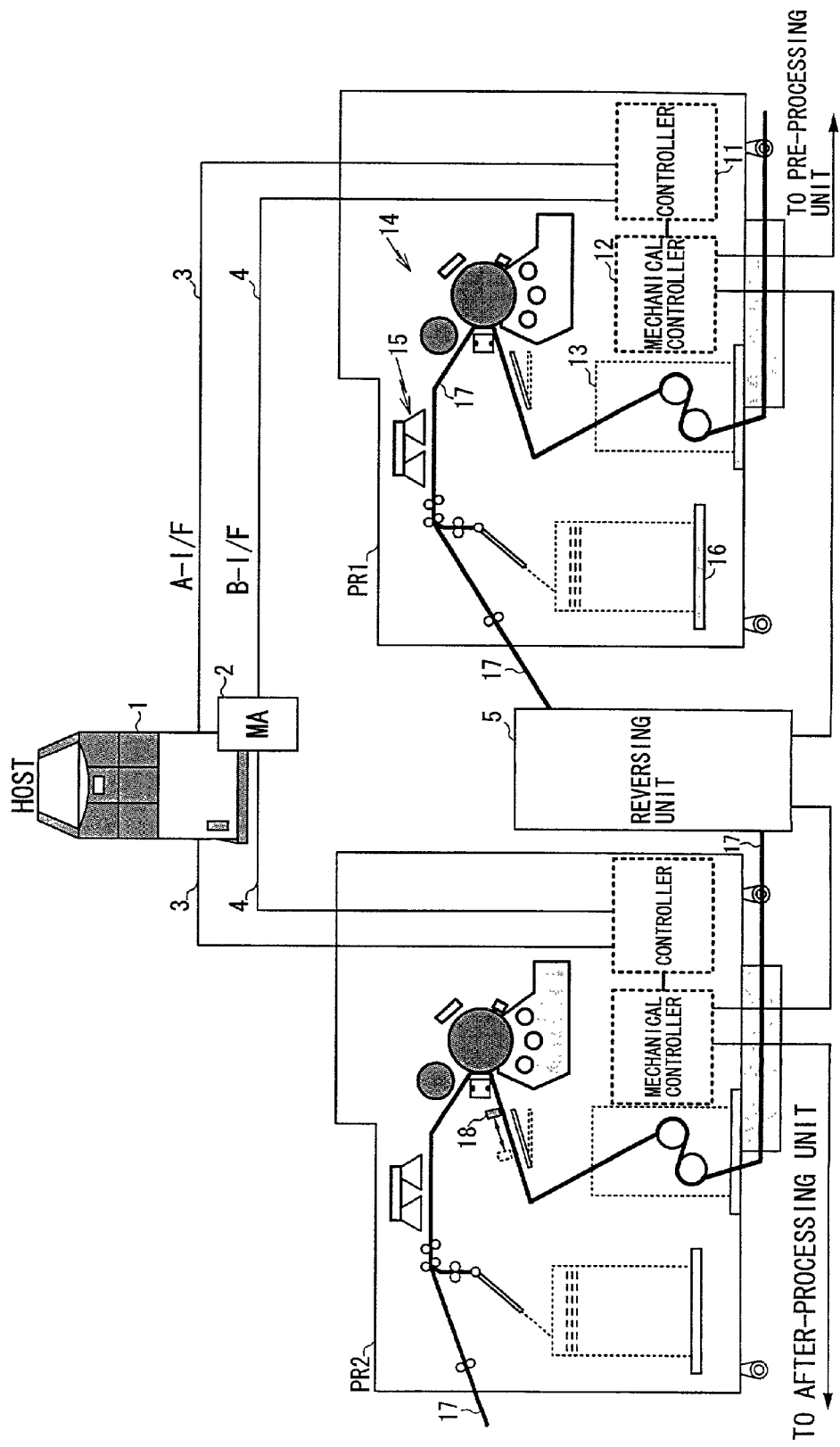
FIG. 1 is a diagram showing an important part of an embodiment of a tandem printing system according to the present invention.

FIG. 1 is a diagram showing an important part of an embodiment of the tandem printing system according to the present invention. This embodiment of the tandem printing system employs an embodiment of the print control method according to the present invention.

As shown in FIG. 1, the tandem printing system includes a host unit 1, a tandem control unit (MA) 2, a plurality of tandem-connected printers PR1 and PR2, and a paper reversing unit 5. For the sake of convenience, FIG. 1 only shows two printers PR1 and PR2, and thus, a continuous recording sheet 17 is supplied to the printer PR1 from a pre-processing unit (not shown) and the continuous recording sheet 17 from the printer PR2 is supplied to an after-processing unit (not shown). However, it is of course possible to connect three or more printers by the tandem connection.

The host unit 1 is formed by a computer system having a known construction including a CPU and the like. Accordingly, an illustration and description of the internal structure of the host unit 1 will be omitted. As will be described later in conjunction with FIG. 2, the tandem control unit 2 is formed by a computer system including a CPU and the like.

The printers PR1 and PR2 have the same construction, and thus, a description will mainly be given with respect to the construction of the printer PR1. The printer PR1 generally includes a controller 11, a mechanical controller 12, a paper supply unit 13, an image forming unit 14, a fixing unit 15, a paper stacking unit 16, and a mark sensor 18. In FIG. 1, only the mark sensor 18 within the printer PR2 is shown for the sake of convenience. The printer PR1 as a whole. The mechanical controller 12 controls mechanical parts within the printer PR1. The paper supply unit 13 supplies the continuous recording sheet 17 into the printer PR1. The image forming unit 14 forms a toner image on the continuous recording sheet 17 by electrophotography based on print data. The fixing unit 15 fixes the toner image on the continuous recording sheet 17. The continuous recording sheet 17 which is printed with the toner image which is fixed, is stacked in the paper stacking unit 16 within the printer PR1 or, supplied to the paper reversing unit 5 so as to supply the continuous recording sheet 17 to the printer PR2 in the next stage. Of course, the construction of the printers PR1 and PR2 is not limited to that described above, and various known constructions may be used for the printers PR1 and PR2.

The paper reversing unit 5 reverses the front and back sides of the continuous recording sheet 17 supplied from the printer PR1 before supplying the continuous recording sheet 17 to the printer PR2. Accordingly, FIG. 1 shows a case where the print is made on both the front and back sides of the continuous recording sheet 17. In a case where the print is to be made on only one side of the continuous recording sheet 17, it is possible to omit the paper reversing unit 5.

The host unit 1 is connected to the controller 11 of each of the printers PR1 and PR2 via the interface 3. In addition, the tandem control unit 2 is connected to the controller 11 of each of the printers PR1 and PR2 via the interface 4. The tandem control unit 2 is connected to the host unit 1, but is operable independently of the host unit 1. The tandem control unit 2 may be provided independently of the host unit 1 as shown in FIG. 1 or, may be provided within the host unit 1, but the tandem control unit 2 is provided independently of each of the printers PR1 and PR2. The host unit 1 supplies print data and print commands to each of the printers PR1 and PR2 via the interface 3. The tandem control unit 2 manages the operating state of each of the printers PR1 and PR2 via the interface 4, and controls the operation of each of the printers PR1 and PR2 in synchronism via the interface 4, in response to the print command from the host unit 1. When the printing is completed, an abnormality is generated in one of the printers PR1 and PR2 or the like, such information may be notified to the host unit 1 if necessary from the tandem control unit 2. More particularly, the tandem control unit 2 carries out synchronous transport control, switching control and error control of each of the printers PR1 and PR2.

In other words, the tandem control unit 2 centrally manages the synchronous control and the like of each of the printers PR1 and PR2, while the host unit 1 receives from the tandem control unit 2 if necessary a detailed information notification related to the completion of the printing, abnormality, switching information and the like separately from the interface 3. For this reason, it is possible to reduce a load on the host unit 1 when carrying out a tandem control, and the load is appropriately distributed between the host unit 1 and the tandem control unit 2.

In addition, each of the printers PR1 and PR2 can basically be realized by an existing printer, with the only exception being that a terminal is provided on the controller 11 to enable connection of the printer to the tandem control unit 2 via the interface 4. For this reason, the tandem printing system can be formed basically by use of existing printers, at a low cost. Furthermore, even when the system structure of the tandem printing system is modified, only the tandem control unit 2 needs to be aware of the modified system structure, and the host unit 1 can carry out the control without being aware of the modified system structure.

Figure 2:
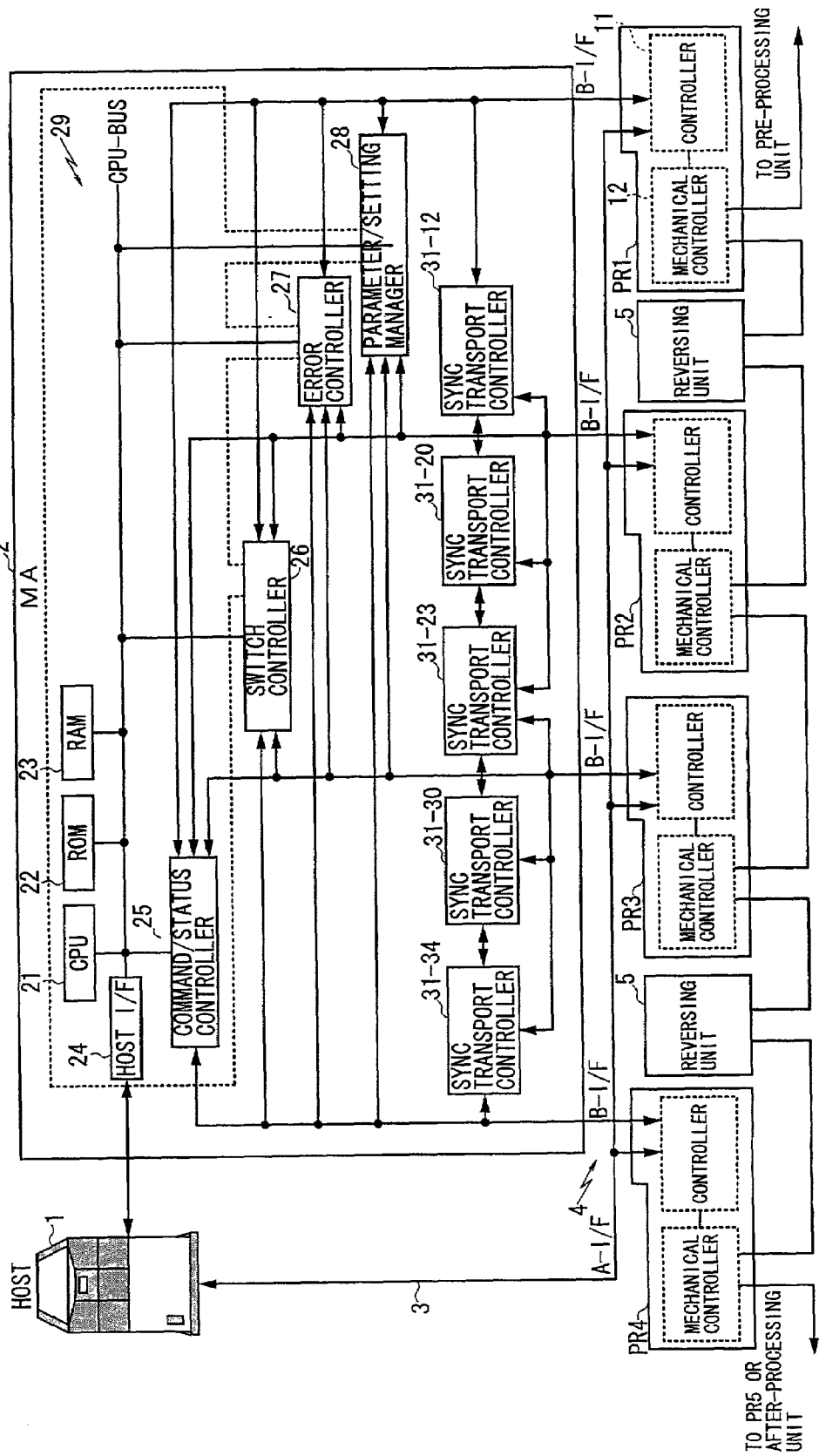
FIG. 2 is a system block diagram showing the construction of a tandem control unit.

FIG. 2 is a system block diagram showing the construction of the tandem control unit 2. In FIG. 2, those parts which are the same as those corresponding parts in FIG. 1 are designated by the same reference numerals, and a description thereof will be omitted. For the sake of convenience, FIG. 2 shows a case where four printers PR1 through PR4 are connected by the tandem-connection.

As shown in FIG. 2, the tandem control unit 2 includes a CPU 21, a ROM 22, a RAM 23, a host interface (I/F) 24, a command/status controller 25, a switch controller 26, an error controller 27, a parameter/setting manager 28, a CPU bus 29, and synchronous transport controllers 31-12, 31-20, 31-23, 31-30 and 31-34. The host interface 24 is connected to a general bus such as PCI within the host unit 1. The CPU 21, the ROM 22, the RAM 23, the host interface 24, the command/status controller 25, the switch controller 26, the error controller 27 and the parameter/setting manager 28 are connected via the CPU bus 29. The synchronous transport controller 31-12 is connected to the synchronous transport controller 31-20, and is connected to the controllers 11 of the printers PR1 and PR2 via the interface 4. The synchronous transport controller 31-20 is connected to the synchronous transport controllers 31-12 and 31-23, and is connected to the controller 11 of the printer PR2 via the interface 4. The synchronous transport controller 31-23 is connected to the synchronous transport controllers 31-20 and 31-30, and is connected to the controllers 11 of the printers PR2 and PR3 via the interface 4. The synchronous transport controller 31-30 is connected to the synchronous transport controllers 31-23 and 31-34, and is connected to the controller 11 of the printer PR3 via the interface 4. The synchronous transport controller 31-34 is connected to the synchronous transport controller 31-30, and is connected to the controllers 11 of the printers PR3 and PR4 via the interface 4.

The synchronous transport controller 31-12 is provided to control the synchronous transport between the printers PR1 and PR2. The synchronous transport controller 31-20 is provided to control the synchronous transport of the printer PR2 relative to the printers PR1 and PR3. The synchronous transport controller 31-23 is provided to control the synchronous transfer between the printers PR2 and PR3. The synchronous transport controller 31-30 is provided to control the synchronous transport of the printer PR3 relative to the printers PR2 and PR4. In addition, the synchronous transport controller 31-34 is provided to control the synchronous transport between the printers PR3 and PR4.

The CPU 21 control the general operation of the tandem control unit 2 as a whole. The ROM 22 stores programs to the executed the CPU 21 and the like. The RAM 23 stores intermediate data obtained during execution of the programs by the CPU 21 and the like. The host interface 24 provides an interface between the CPU 21 within the tandem control unit 2 and a CPU within the host unit 1.

Figure 3:
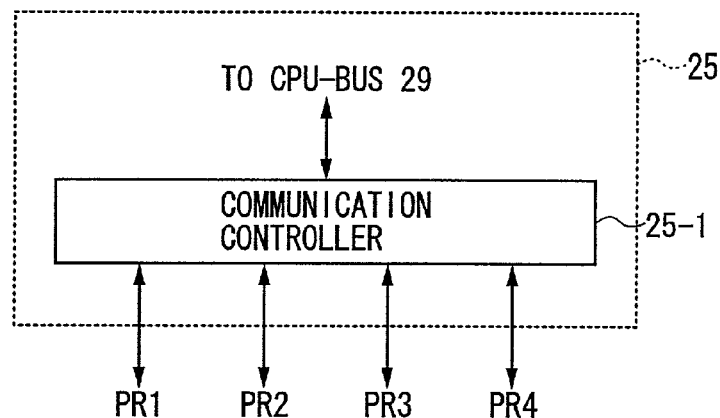
FIG. 3 is a system block diagram showing the construction of a command/status controller.

The command/status controller 25 controls commands to each of the printers PR1 through PR4 and status from each of the printers PR1 through PR4. In this embodiment, the command/status controller 25 has the construction shown in FIG. 3. As shown in FIG. 3, the command/status controller 25 includes a communication controller 25-1 which exchanges the commands and status with the controller 11 of each of the printers PR1 through PR4 via the interface 4.

Figure 4:
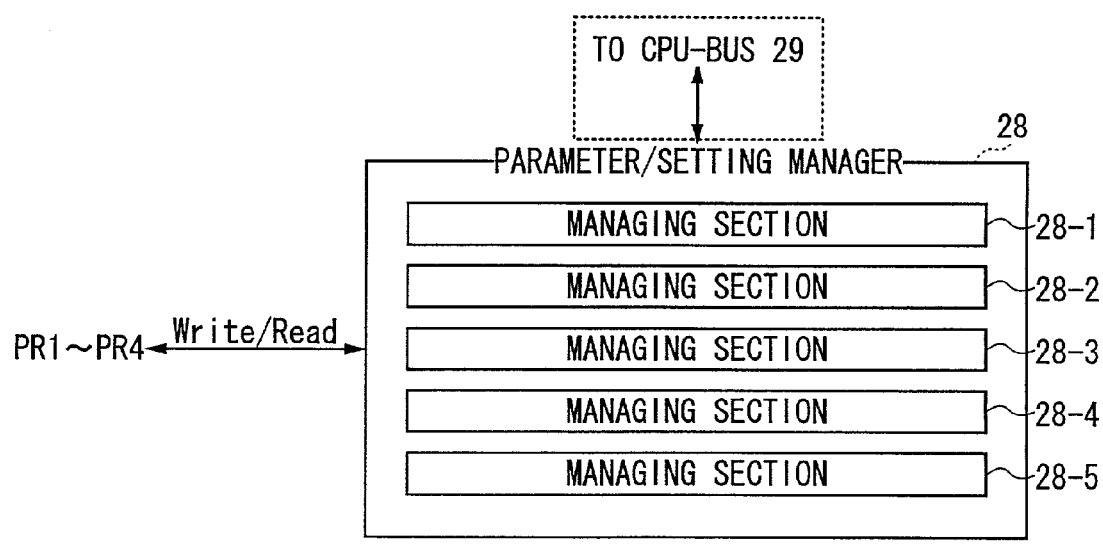
FIG. 4 is a system block diagram showing the construction of a parameter/setting manager.

The parameter/setting manager 28 manages parameters and settings with respect to each of the printers PR1 through PR4. In this embodiment, the parameter/setting manager 28 has the construction shown in FIG. 4. As shown in FIG. 4, the parameter/setting manager 28 includes a managing section 28-1 for managing the settings of automatic loading quantities of the printers PR1 through PR4, a managing section 28-2 for managing the settings of non-printing transport modes of the printers PR1 through PR4, a managing section 28-3 for managing a printed page mark number at the printer PR1 provided at the first stage, a managing section 28-4 for managing the existence of non-printed data among the printers PR1 through PR4, and a managing section 285 for managing the existence of non-printed data within the printers PR1 through PR4. The parameter/setting manager 28 exchanges information with the controller 11 of each of the printers PR1 through PR4, and manages the parameters/settings in the corresponding managing sections 28-1 through 285.

Figure 5:
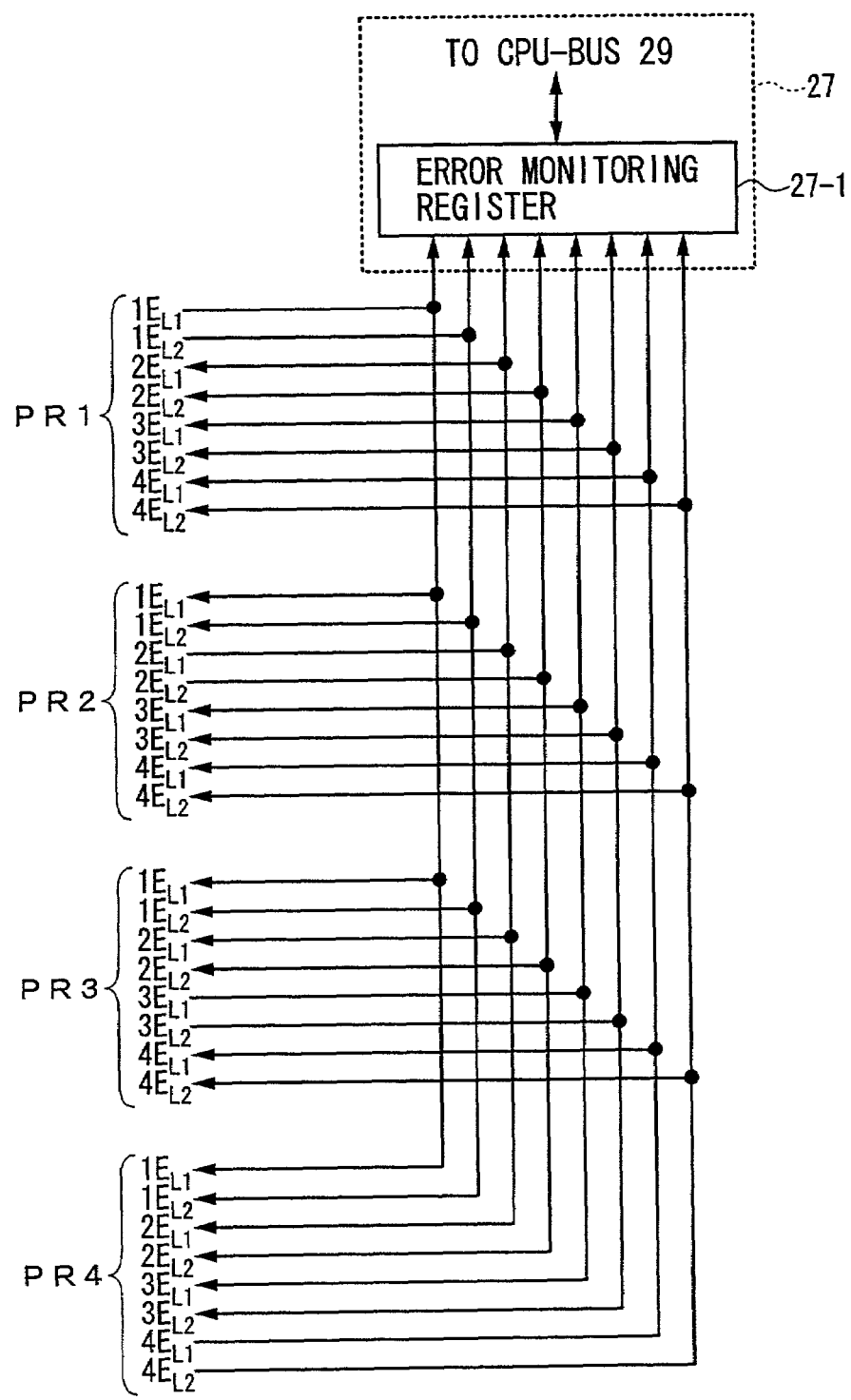
FIG. 5 is a system block diagram showing the construction of an error controller.

The error controller 27 carries out an error control by monitoring an error generated in each of the printers PR1 through PR4. In this embodiment the error controller 27 has the construction shown in FIG. 5. As shown in FIG. 5, the error controller 27 includes an error monitoring register 27-1 which is connected to the controller 11 of each of the printers PR1 through PR4 via the interface 4, and monitors and records the error generated in each of the printers PR1 through PR4. When an error is generated in the printer PR1, for example, error information indicating this error is recorded in the error monitoring register 27-1, and the error information is notified to the other printers PR2 through PR4, so as to synchronize the printers PR1 through PR4 or to stop the printing operation. In FIG. 5, $1E_{L1}$, $2E_{L1}$, . . . respectively correspond to a bit of a flag which indicates one error level information.

Figure 6:
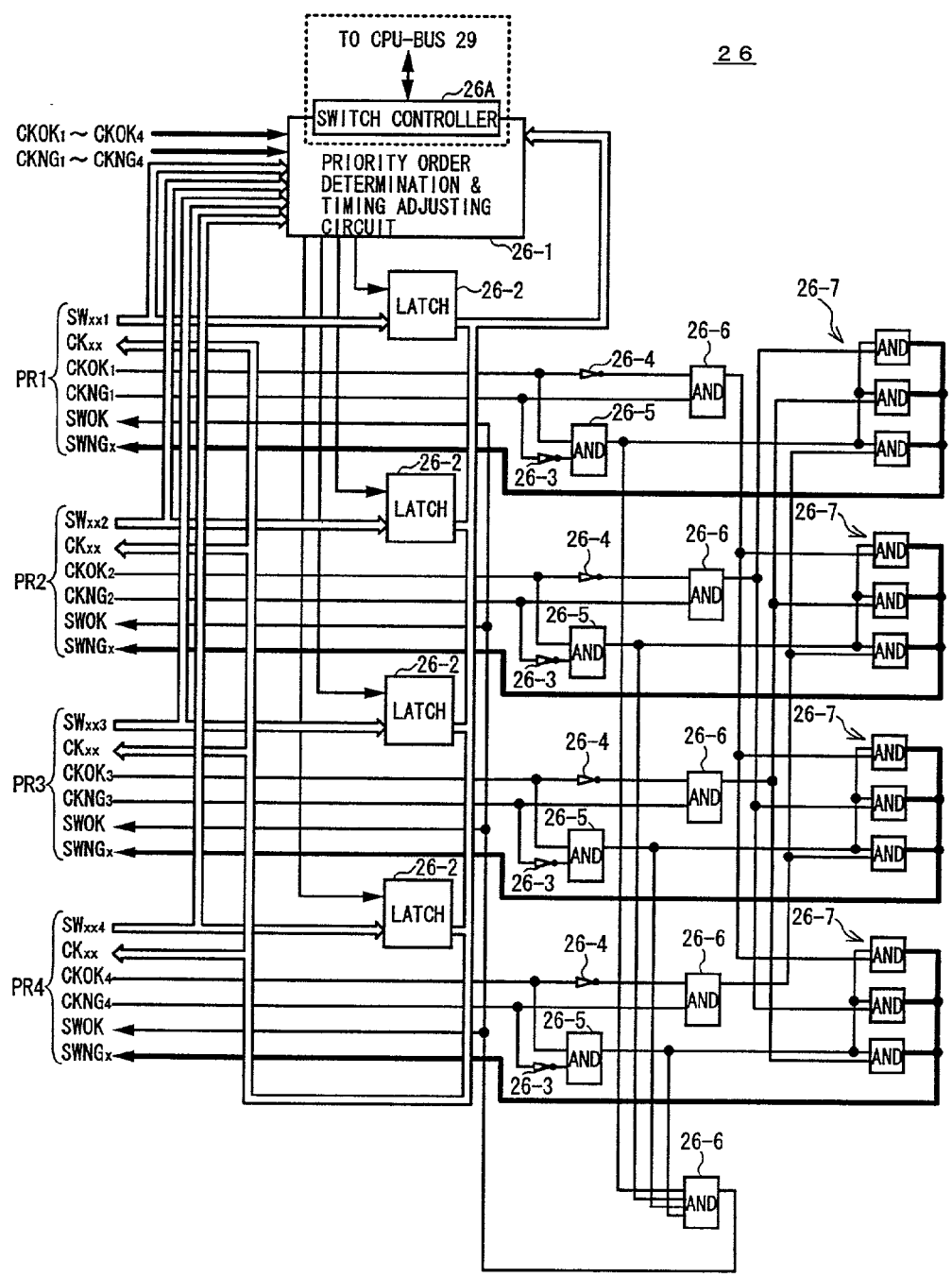
FIG. 6 is a system block diagram showing the construction of a switch controller.

The switch controller 26 carries out a switching control by monitoring switches (not shown) such as a start switch of each of the printers PR1 through PR4. The start switch is provided in the existing printer, and is pushed when starting the printing operation. In this embodiment, the switch controller 26 has the construction shown in FIG. 6. The switch controller 26 includes a priority order determination and timing adjusting circuit 26-1, a switch monitoring register 26A, latch circuits 26-2, inverters 26-3, AND circuits 26-5 and 26-6, and AND circuit groups 26-7 each made up of three AND circuits, which are connected as shown in FIG. 6. The switch controller 26 exchanges information with the controller 11 of each of the printers PR1 through PR4 via the interface 4, and carries out operations such as determining the priority order among the switches which are pushed within the printers PR1 through PR4, and instructing operations of the indicated by the pushed switches in the determined priority order.

In FIG. 6, SWxx denotes a switch code signal from a printer having the pushed switch, and xx denotes a switch code. For example, the start switch is defined by XX=00, and a stop switch is defined by XX=01. CKxx denotes an inquiry signal which is used to inquire whether or not the switch code xx of the switch code signal SWxx is executable, with respect to all of the printers PR1 through PR4. CKOK denotes a signal which is used to indicate that the switch code xx of the switch code signal SWxx is executable, with respect to the inquiry signal CKxx. CKNG denotes a signal which is used to indicate that the switch code xx of the switch code signal SWxx is non-executable, with respect to the inquiry signal CKxx. SWOK denotes a signal which is used to instruct execution of the inquired switch code xx, with respect to all of the printers PR1 through PR4. In addition, SWNGx denotes a signal which is used to instruct cancelling execution of the switch code caused by a printer PRx, with respect to a printer which returns the signal CKOK.

Figure 7:
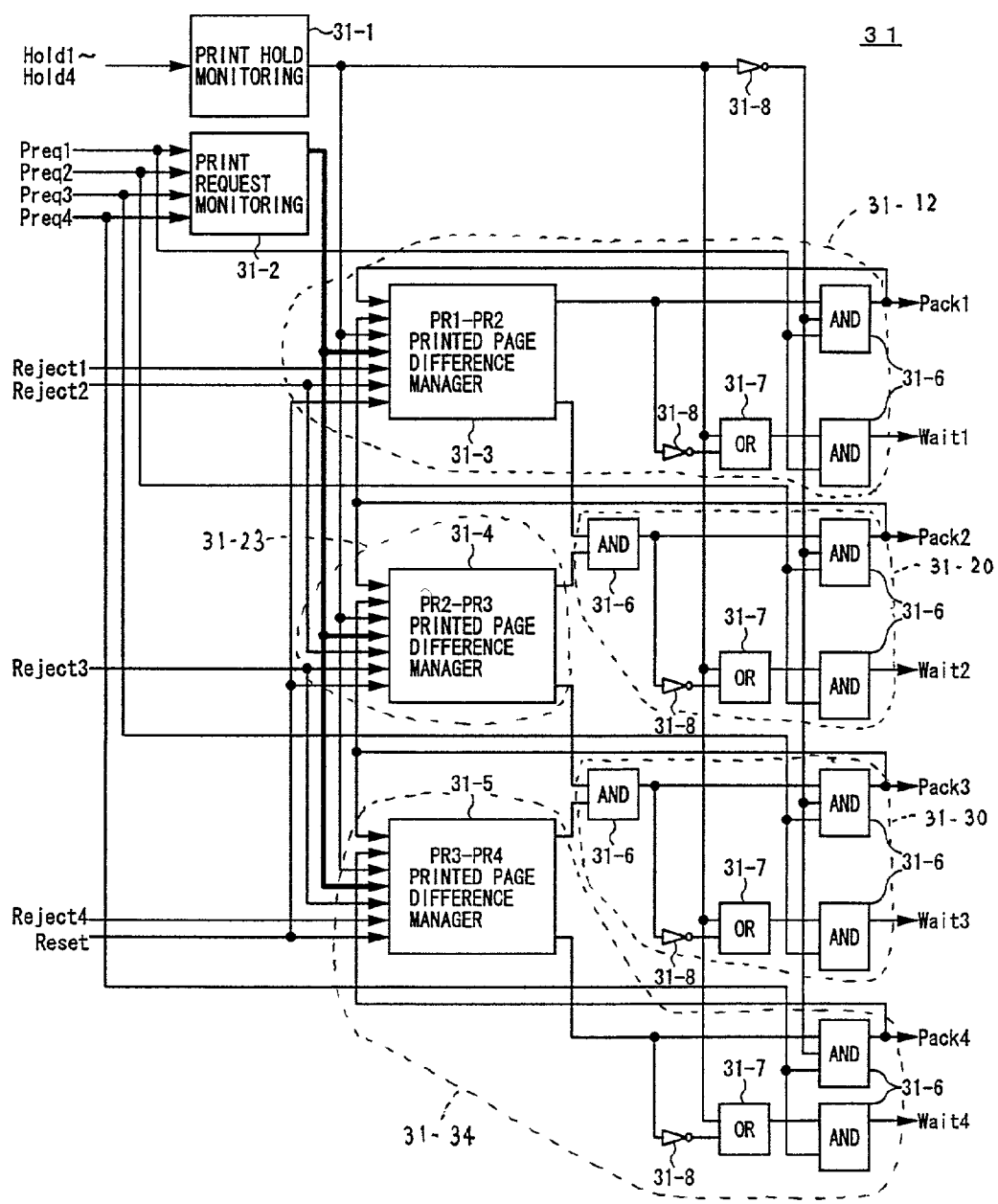
FIG. 7 is a system block diagram showing the construction of a synchronous transport controller.

A synchronous transport controller 31 shown in FIG. 7 includes a print hold monitoring part 31-1, a print request monitoring part 31-2, and the synchronous transport controllers 31-12, 31-23, 31-34, 31-20 and 31-30 which are respectively indicated by dotted lines. More particularly, the synchronous transport controller 31 includes the print hold monitoring part 31-1, the print request monitoring part 31-2, a PR1-PR2 printed page difference manager 31-3, a PR2-PR3 printed page difference manager 31-4, a PR3-PR4 printed page difference manager 31-5, AND circuits 31-6, OR circuits 31-7, and inverters 31-8, which are connected as shown in FIG. 7.

In FIG. 7, Preqx denotes a paper transport request amounting to one page from the printer PRx, and Packx denotes a paper transport enable signal with respect to the paper transport request Preqx. Holdx denotes a signal for holding, that is, suppressing, the paper transport enable signal Packx with respect to the paper transport request Preqx. Waitx denotes a signal instructing wait with respect to the paper transport request Preqx. Rejectx denotes a signal indicating that the paper transport amounting to one page could not be made from the printer PRx for some reason, with respect to the paper transport enable signal Packx. Further, Reset denotes a reset signal for initializing a difference counter of the printed page difference managers 31-3 through 31-5.

The print hold monitoring part 31-1 monitors the signals Hold1 through Hold4 from the printers PR1 through PR4. The print request monitoring part 31-2 monitors the paper transport requests Preq1 through Preq4 from the printers PR1 through PR4. The PR1-PR2 printed page difference manager 31-3 manages a printed page difference between the printers PR1 and PR2. The PR2-PR3 printed page difference manager 31-4 manages a printed page difference between the printers PR2 and PR3. Further, the PR3-PR4 printed page difference manager 31-5 manages a printed page difference between the printers PR3 and PR4. The paper transport enable signals Pack1 through Pack4 and the signals Wait1 through Wait4 with respect to the printers PR1 through PR4 are output from the AND circuits 31-6 provided at the output stage of the synchronous transport controller 31.

Figure 8:
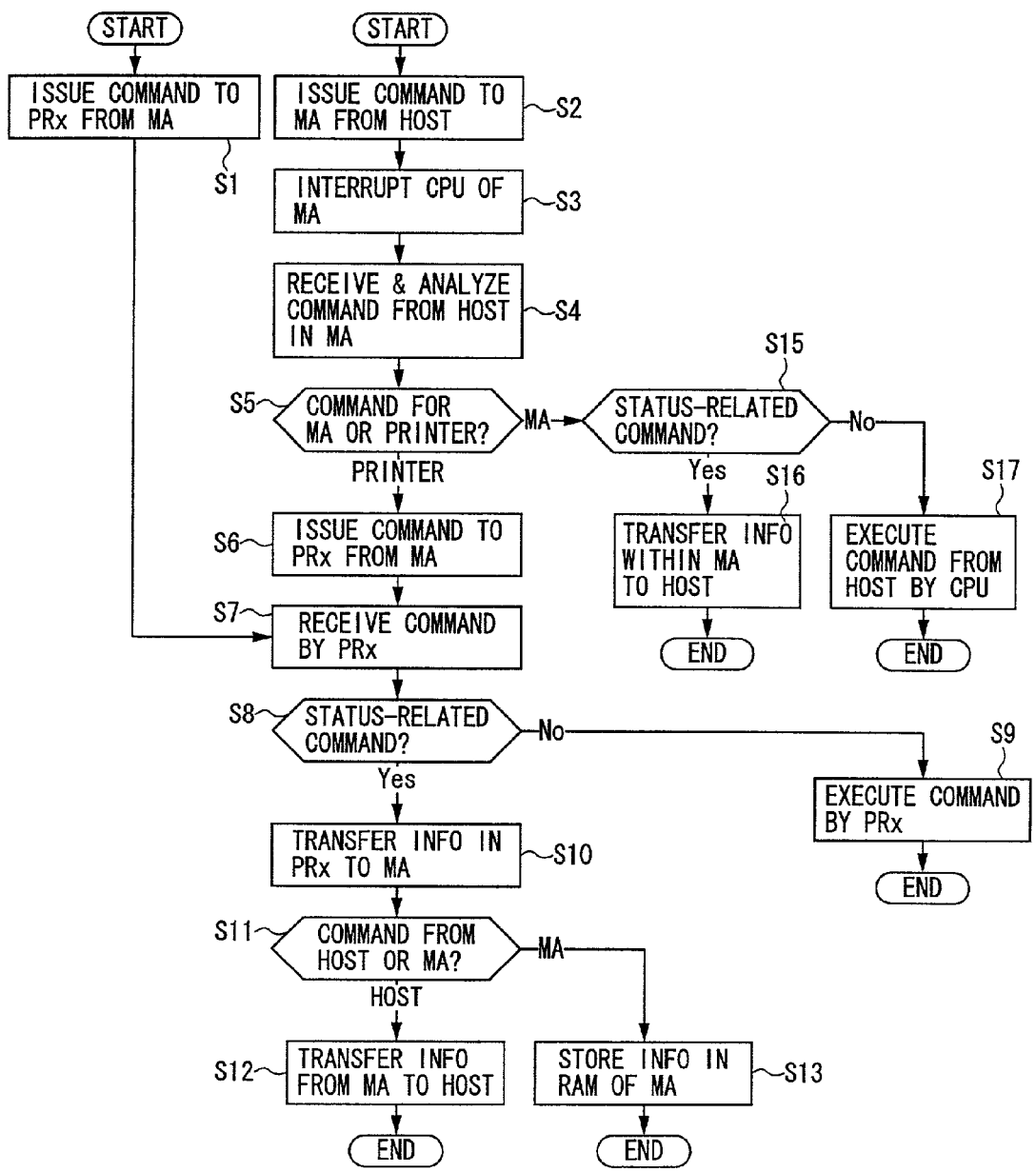
FIG. 8 is a flow chart for explaining a command/status control process.

FIG. 8 is a flow chart for explaining a command/status control process of the command/status controller 25. In a step S1 shown in FIG. 8, the tandem control unit 2 issues a command with respect to the printer PRx at an arbitrary timing, and the process advances to a step S7. On the other hand, in a step S2, the host unit 1 issues a command with respect to the tandem control unit 2 at an arbitrary timing. A step S3 makes an interrupt with respect to the CPU 21 of the tandem control unit 2. In a step S4, the CPU 21 of the tandem control unit 2 receives and analyzes the command from the host unit 1. A step S5 decides whether the command received by the CPU 21 is with respect to the tandem control unit 2 or with respect to the printer PRx. If the command is with respect to the printer PRx, the CPU 21 issues the command from the host unit 1 with respect to the printer PRx in a step S6. In a step S7, the printer PRx receives the command issued from the host unit 1 via the tandem control unit 2.

A step S8 decides whether or not the command received by the printer PRx is a status related command. If the decision result in the step S8 is NO, the printer PRx executes the received command in a step S9, and the process ends. On the other hand, if the decision result in the step S8 is YES, the printer PRx which receives the status-related command transfers to the tandem control unit 2 information which includes a status within the printer PRx with respect to the command, in a step S10. A step S11 decides whether the received command is from the host unit 1 or from the tandem control unit 2. If the received command is from the host unit 1, the tandem control unit 2 which receives the information from the printer PRx transfers the information to the host unit 1 in a step S12, and the process ends. In this case, when a plurality of printers PRx are provided, the information from all of the printers PRx is collected and transferred to the host unit 1. On the other hand, if the received command is from the tandem control unit 2, the tandem control unit 2 which receives the information from the printer PRx stores the information within the RAM 23 of the tandem control unit 2 in a step S13, and the process ends. In this case, if a plurality of printers PRx are provided, the information from all of the printers PRx is collected and stored within the RAM 23 of the tandem control unit 2.

On the other hand, if the decision result of the step S5 indicates that the command is with respect to the tandem control unit 2, a step S15 decides whether or not the command is a status-related command. If the decision result in the step S15 is YES, the CPU 21 of the tandem control unit 2 transfers to the host unit 1 the information within the tandem controller 2 with respect to the status-related command from the host unit 1 in a step S16, and the process ends. In this case, the information transferred to the host unit 1 includes information related to the error, switches, parameters, setting management and the like. On the other hand, if the decision result in the step S15 is NO, the CPU 21 of the tandem control unit 2 executes the command from the host unit 1 in a step S17, and the process ends. In this case, the tandem control unit 2 carries out operations such as modifying the information related to the parameters and the setting management, by executing the command from the host unit 1.

Figure 9:
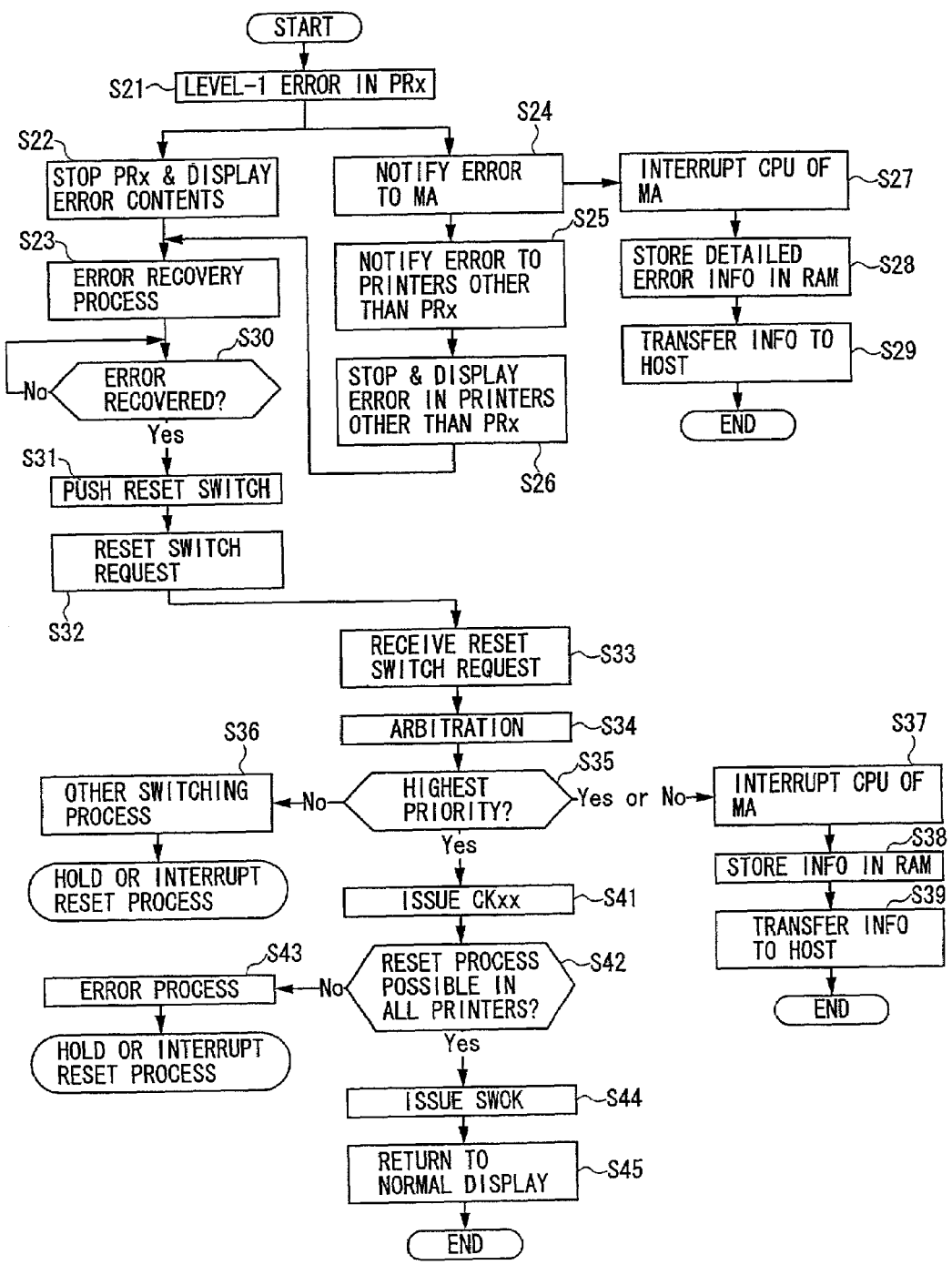
FIG. 9 is a flow chart for explaining an error control process.

FIG. 9 is a flow chart for explaining an error control process of the error controller 27. In FIG. 9, it is assumed for the sake of convenience that, in a step S21, a level-1 error ($XE_{L1}$) is generated in the printer PRx. In this case, a step S22 stops the printer PRx, and displays error contents on a display panel (not shown) which has a known construction and is provided on the printer PRx. In a step S23, a user or a maintenance person performs an error recovery process on the printer PRx. At the same time as the step S22, a step S24 notifies the generation of the error $XE_{L1}$ from the printer PRx to the tandem control unit 2. In addition, in a step S25, the tandem control unit 2 notifies the generation of the error $XE_{L1}$ in the printer PRx to each of the other printers of the tandem printing system. A step S26 stops each of the printers of the tandem printing system other than the printer PRx, and displays the generation of the error $XE_{L1}$ on the display panel of each of the printers other than the printer PRx, before the process advances to a step S30.

In addition, after the step S24, a step S27 interrupts the CPU 21 within the tandem control unit 2. In a step S28, the CPU 21 obtains detailed error information from the printer PRx via the command/status controller 25, and stores the detailed error information in the RAM 23. Further, the CPU 21 transfers the detailed error information to the host unit 1 at a predetermined timing or, at the request from the host unit 1.

The step S30 decides whether or not the error of the printer PRx is recovered. If the decision result in the step S30 is YES, the user or the maintenance person pushes a known reset switch (not shown) of the printer PRx in a step S31. In a step S32, the printer PRx outputs a reset switch request to the switch controller 26 of the tandem control unit 2. In a step S33, the tandem control unit 2 receives the reset switch request from the printer PRx. In a step S34, the tandem control unit 2 carries out an arbitration of the switch requests from each of the printers of the tandem printing system other than the printer PRx. In a step S35, the tandem control unit 2 decides whether or not the reset switch request from the printer PRx has the highest priority order.

If the decision result in the step S35 is NO, a step S36 moves to another switching process, and the process ends. In addition, if the decision result in the step S35 is YES or NO, a step S37 generates an interrupt with respect to the CPU 21 of the tandem control unit 2 when the switch request having the highest priority order is determined. In a step S38, the CPU 21 makes access to the switch monitoring register 26A, and stores the information such as SWxx, CKxx and SWNGx in the RAM 23. In a step S39, the CPU 21 transfers the information to the host unit 1 at a predetermined timing or, at the request from the host unit 1, and the process ends.

On the other hand, if the decision result in the step S35 is YES, the tandem control unit 2 inquires whether a reset process is possible with respect to all of the printers of the tandem printing system, by issuing the inquiry signal CKxx in a step S41. A step S42 decides whether or not the reset process is possible in all of the printers of the tandem printing system. If the decision result in the step S42 is NO, a step S43 carries out an error process, and the reset process of the printers is held or interrupted. On the other hand, if the decision result in the step S42 is YES, the tandem control unit 2 instructs the reset process with respect to all of the printers of the tandem printing system by issuing the signal SWOK in a step S44. In a step S45, the error display is cancelled and the display on the display panel is returned to the normal display at each of the printers which receive the signal SWOK, and the process ends.

Figure 10:
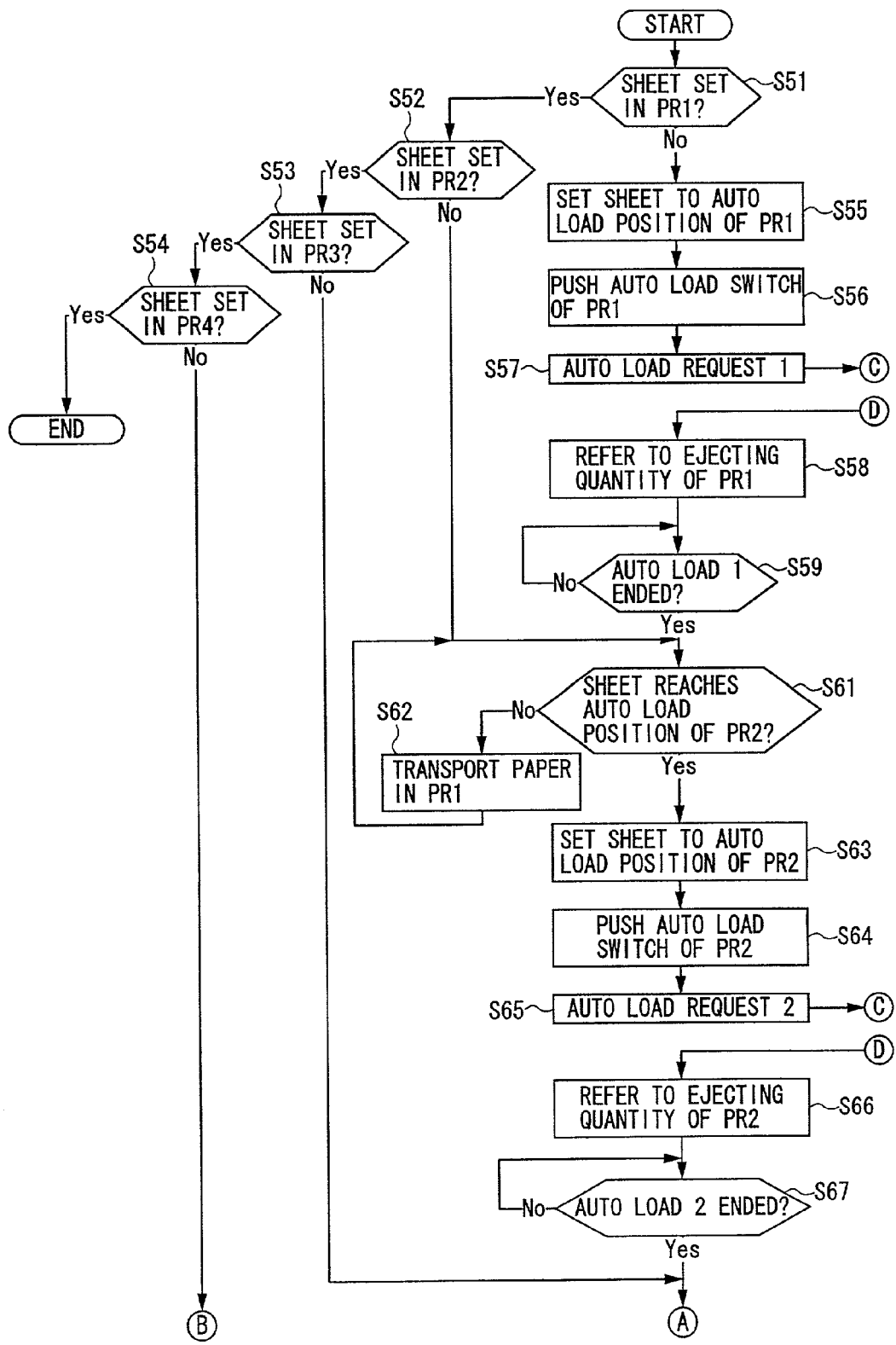
FIG. 10 is a flow chart for explaining an automatic loading process.
Figure 11:
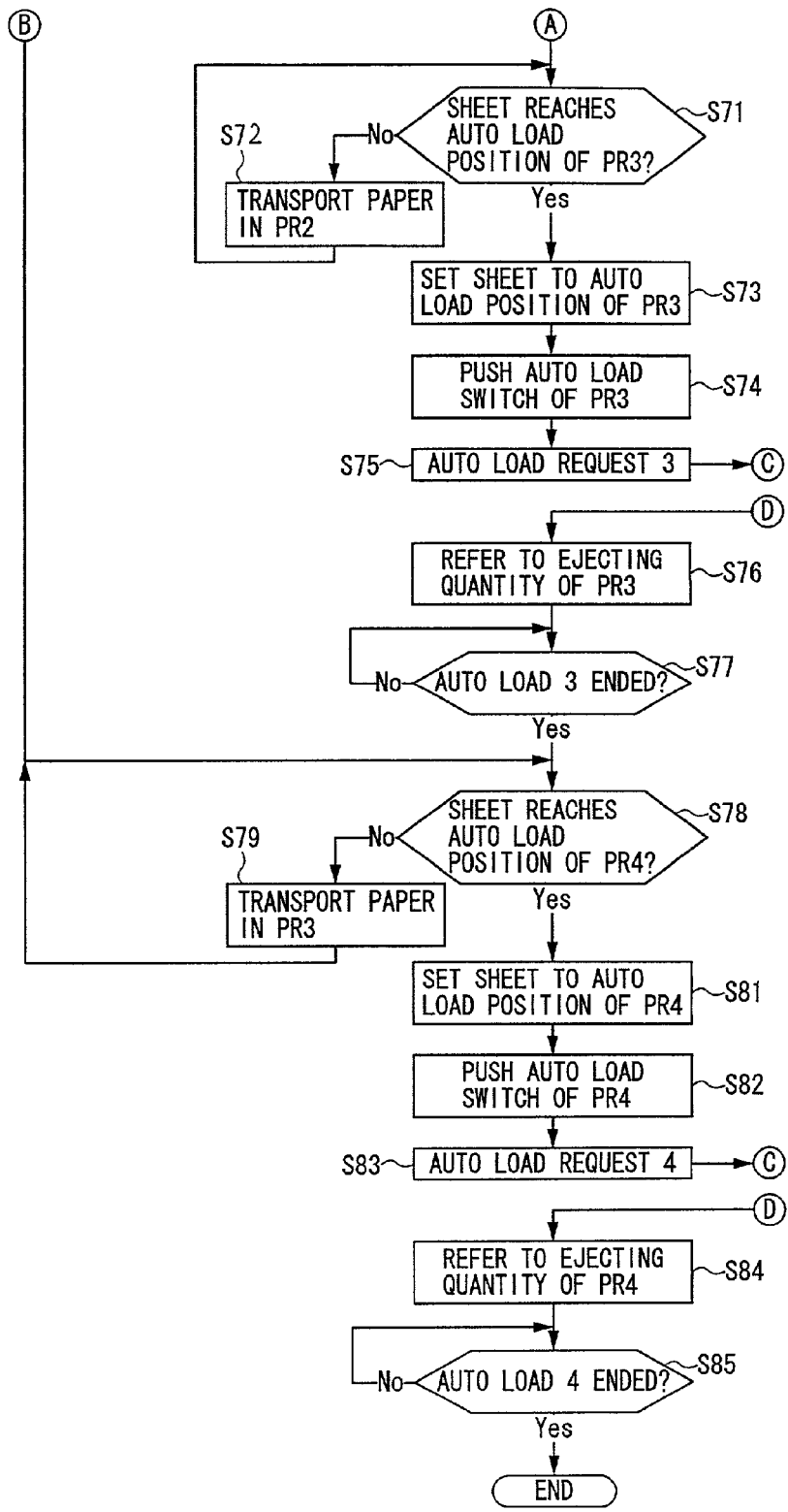
FIG. 11 is a flow chart for explaining the automatic loading process.
Figure 12:
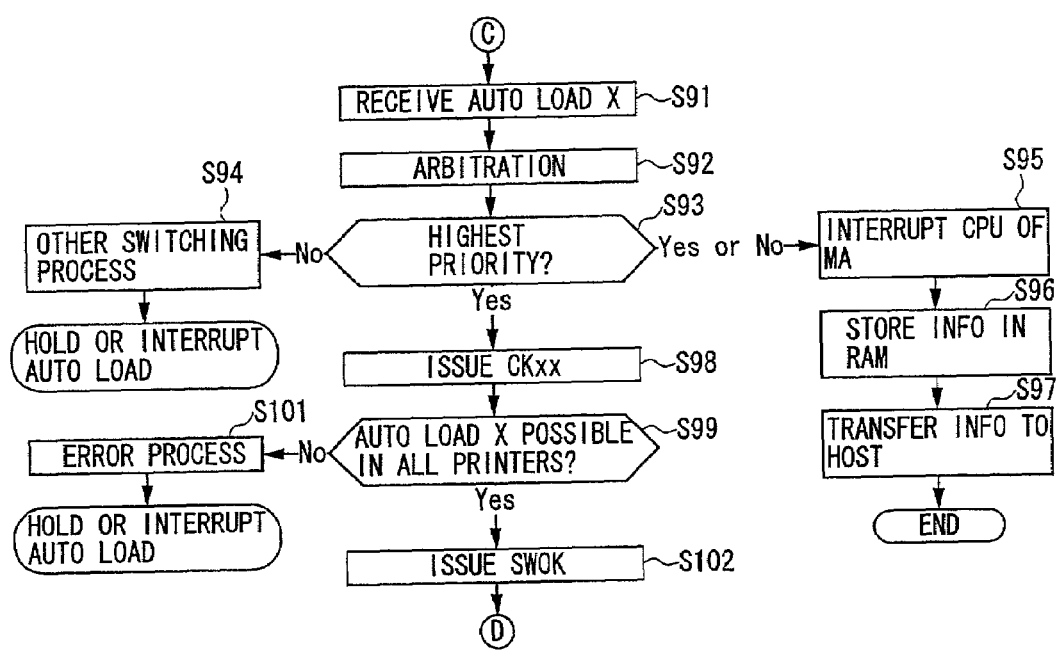
FIG. 12 is a flow chart for explaining the automatic loading process.

FIGS. 10 through 12 are flow charts for explaining an automatic loading process. In FIG. 10, a step S51 decides whether or not the continuous recording sheet 17 is set in the printer PR1. If the decision result in the step S51 is YES, a step S52 decides whether or not the continuous recording sheet 17 is set in the printer PR2. If the decision result in the step S52 is YES, a step S53 decides whether or not the continuous recording sheet 17 is set in the printer PR3. If the decision result in the step S53 is YES, a step S54 decides whether or not the continuous recording sheet 17 is set in the printer PR4. The process ends if the decision result in the step S54 YES.

If the decision result in the step S51 is NO, a step S55 sets a starting end of the continuous recording sheet 17 at an automatic loading start position of the printer PR1. The user pushes a known automatic loading switch (not shown) of the printer PR1 in a step S56. The automatic loading switch is pushed when instructing the automatic loading of the continuous recording sheet 17 to the printer concerned. Such an automatic loading function itself is known. In a step S57, the printer PR1 outputs an automatic loading request 1 to the switch controller 26 of the tandem control unit 2, and the process advances to a step S91 which will be described later in conjunction with FIG. 12.

If the decision result in the step S52 is NO, the process advances to a step S61 which will be described later. If the decision result in the step S53 is NO, the process advances to a step S71 which will be described later in conjunction with FIG. 11. In addition, if the decision result in the step S54 is NO, the process advances to a step S78 which will be described later in conjunction with FIG. 11.

In the step S91 shown in FIG. 12, the switch controller 26 of the tandem control unit 2 receives an automatic loading request X (initially, X=1). In a step S92, the tandem control unit 2 carries out an arbitration of the switch requests from the printers of the tandem printing system other than the printer which output the automatic loading request X. A step S93 decides whether or not the automatic loading request X has the highest priority order. If the decision result in the step S93 is NO, a step S94 moves to another switching process, and the automatic loading is held or interrupted. In addition, if the decision result in the step S93 is YES or NO, a step S95 issues an interrupt with respect to the CPU 21 of the tandem control unit 2 when the switch request having the highest priority order is determined. In a step S96, the CPU 21 makes access to the switch monitoring register 26A, and stores the information such as SWxx, CKxx and SWNGX in the RAM 23. In a step S97, the CPU 21 transfers the information to the host unit 1 at a predetermined timing or, at the request from the host unit 1, and the process ends.

On the other hand, if the decision result in the step S93 is YES, the tandem control unit 2 issues the inquiry signal CKxx in a step S98, and inquires whether the automatic loading request X is executable, with respect to all of the printers of the tandem printing system. In this case, each printer which is not related to the automatic loading request X returns the signal CKOK to the tandem control unit 2. In a step S99, the tandem control unit 2 decides whether or not the automatic loading request X is executable in all of the printers of the tandem printing system. If the decision result in the step S99 is NO, a step S101 carries out an error process, and the automatic loading is held or interrupted. On the other hand, if the decision result in the step S99 is YES, the tandem control unit 2 issues the signal SWOK instructing execution of the automatic loading request X with respect to all of the printers of the tandem printing system in a step S102. After the step S102, the process advances to a step S58 shown in FIG. 10, a step S66 shown in FIG. 10, a step S76 shown in FIG. 11, and a step S84 shown in FIG. 11. In this case, each printer which is not related to the automatic loading request X ignores the signal SWOK.

The step S58 shown in FIG. 10 refers to the paper ejecting quantity of the continuous recording sheet 17 which is to be ejected from the printer PR1, and executes the automatic loading request 1. The paper ejecting quantity is indicated by a number of pages or a transport distance of the continuous recording sheet 17. A step S59 decides whether or not the execution of the automatic loading request 1 is ended. If the decision result in the step S59 becomes YES, a step S61 decides whether or not the end of the continuous recording sheet 17 reaches the automatic loading start position of the printer PR2. If the decision result in the step S61 is NO, the printer PR1 executes a paper transport in a step S62, and the process returns to the step S61. If the decision result in the step S61 is YES, a step S63 sets the end of the continuous recording sheet 17 to the automatic loading start position of the printer PR2, and the user pushes the automatic loading switch of the printer PR2 in a step S64. The printer PR2 issues an automatic loading request 2 with respect to the switch controller 26 of the tandem control unit 2 in a step S65, and the process advances to the step S91 shown in FIG. 12. In this case, the automatic loading request X becomes X=2.

On the other hand, the step S66 refers to the paper ejecting quantity of the continuous recording sheet 17 which is to be ejected from the printer PR2, and executes the automatic loading request 2. The paper ejecting quantity is indicated by the number of pages or the transport distance of the continuous recording sheet 17. The printer PR1 carries out a paper transport by an amount identical to that of the printer PR2. A step S67 decides whether or not the execution of the automatic loading request 2 is ended. If the decision result in the step S67 becomes YES, a step S71 shown in FIG. 11 decides whether or not the end of the continuous recording sheet 17 reaches the automatic loading start position of the printer PR3. If the decision result in the step S71 is NO, the printer PR2 executes a paper transport in a step S72, and the process returns to the step S71. In this case, the paper transports of the printers PR1 and PR2 are synchronized and are carried out by the same amount. If the decision result in the step S71 is YES, a step S73 sets the end of the continuous recording sheet 17 to the automatic loading start position of the printer PR3, and the user pushes the automatic loading switch of the printer PR3 in a step S74. The printer PR3 issues an automatic loading request 3 with respect to the switch controller 26 of the tandem control unit 2 in a step S75, and the process advances to the step S91 shown in FIG. 12. In this case, the automatic loading request X becomes X=3.

In addition, the step S76 shown in FIG. 11 refers to the paper ejecting quantity of the continuous recording sheet 17 which is to be ejected from the printer PR3, and executes the automatic loading request 3. The paper ejecting quantity is indicated by the number of pages or the transport distance of the continuous recording sheet 17. The printers PR1 and PR2 each carry out a paper transport by an amount identical to that of the printer PR3. A step S77 decides whether or not the execution of the automatic loading request 3 is ended. If the decision result in the step S77 becomes YES, a step S78 decides whether or not the end of the continuous recording sheet 17 reaches the automatic loading start position of the printer PR4. If the decision result in the step S78 is NO, the printer PR3 executes a paper transport in a step S79, and the process returns to the step S78. In this case, the paper transports of the printers PR1, PR2 and PR3 are synchronized and are carried out by the same amount. If the decision result in the step S78 is YES, a step S81 sets the end of the continuous recording sheet 17 to the automatic loading start position of the printer PR4, and the user pushes the automatic loading switch of the printer PR4 in a step S82. The printer PR4 issues an automatic loading request 4 with respect to the switch controller 26 of the tandem control unit 2 in a step S83, and the process advances to the step S91 shown in FIG. 12. In this case, the automatic loading request X becomes X=4.

Furthermore, the step S84 shown in FIG. 11 refers to the paper ejecting quantity of the continuous recording sheet 17 which is to be ejected from the printer PR4, and executes the automatic loading request 4. The paper ejecting quantity is indicated by the number of pages or the transport distance of the continuous recording sheet 17. The printers PR1, PR2 and PR3 each carry out a paper transport by an amount identical to that of the printer PR4. A step S85 decides whether or not the execution of the automatic loading request 4 is ended. The process ends if the decision result in the step S85 becomes YES.

Next, a description will be given of a particular operation of this embodiment. When setting the continuous recording sheet 17 in the printers PR1 through PRz in a state where the continuous recording sheet 17 is not set in the printers PR1 through PRz, the starting end of the continuous recording sheet 17 is aligned and set to the automatic loading start position of the printer PR1. Thereafter, the continuous recording sheet 17 is transported so as to pass the image forming unit 14, the fixing unit 15 and the like of the printer PR1 and is ejected from a paper eject opening of the printer PR1, in response to the automatic loading start instruction. The paper ejecting quantity from the printer PR1 in this case is determined by a value set within the printer PR1 or within the tandem control unit 2. In a case where the paper reversing unit 5 is provided on the output stage of the printer PR1, an amount of the continuous recording sheet 17 which must be set within the paper reversing unit 5 is included in the set value of the paper ejecting quantity, so that the paper ejecting quantity from the printer PR1 is sufficient to enable the starting end of the continuous recording sheet 17 to reach the automatic loading start position of the printer PR2. The paper ejecting quantity may be set to an arbitrary value as long as the above described conditions are satisfied. Further, the set value of the paper ejecting quantity may be specified by the number of pages each having a constant page length or, by a distance to the printer PR2.

When carrying out the automatic loading in the printer PR2 provided at the stage next to the printer PR1, the starting end of the continuous recording sheet 17 which is ejected from the printer PR1 is aligned and set to the automatic loading start position of the printer PR2. Thereafter, the continuous recording sheet 17 is transported so as to pass the image forming unit 14, the fixing unit 15 and the like of the printer PR2 and is ejected from a paper eject opening of the printer PR2, in response to the automatic loading start instruction. The paper ejecting quantity from the printer PR2 in this case is determined by a value set within the printer PR2 or within the tandem control unit 2. In a case where the paper reversing unit 5 is provided on the output stage of the printer PR2, an amount of the continuous recording sheet 17 which must be set within the paper reversing unit 5 is included in the set value of the paper ejecting quantity, so that the paper ejecting quantity from the printer PR2 is sufficient to enable the starting end of the continuous recording sheet 17 to reach the automatic loading start position of the printer PR3. If no printer is provided at on the output stage of the printer PR2 and an after-processing unit is provided on the output stage of the printer PR2, the paper ejecting quantity from the printer PR2 is similarly set so as to include the amount which must be set within the after-processing unit.

When carrying out the automatic loading in the printer PR2, the automatic loading start instruction due to the automatic loading request 2 is supplied to the printer PR1 from the printer PR2 via the tandem control unit 2. In this state, the continuous recording sheet 17 is already set in the printer PR1, and the printer PR1 thus carries out a paper transport in synchronism with the printer PR2. The paper transport quantity of the printer PR1 in this case is determined by the value set within the printer PR1 or within the tandem control unit 2, and basically, is the same as the paper transport quantity of the printer PR2. Thereafter, automatic loading processes similar to the above is carried out in the printers provided at the stages subsequent to the printer PR2, when the printers PR3 through PRz are provided in the subsequent stages to the printer PR2 in the tandem-connection.

When the automatic loading with respect to the printers PR1 through PRz and the setting of the continuous recording sheet 17 with respect to the after-processing unit are completed, and the host unit 1 and the printers PR1 through PRz are to be connected by an on-line connection, the start switch of the printer PR1 or PRi (i=2, . . . , n) is pushed to instruct the print start, so as to make a transition to the on-line state. The transition to the on-line-state is made in a state where the printers PR1 through PRz are synchronized. The print start instruction may be given from any one of the printers PR1 through PRz, and in order to synchronize the printers PR1 through PRz, a print start instruction (SWxx) from the printer having the start switch which is pushed is notified to the tandem control unit 2. The tandem control unit 2 issues an inquiry (CKxx) with respect to each of the printers PR1 through PRz in response to the received print start instruction. When a response (CKOK) indicating that the printing can be started is received from all of the printers PR1 through PRz in response to the inquiry, the tandem control unit 2 issues a print start instruction (SWOK) with respect to all of the printers PR1 through PRz, to thereby put the printers PR1 through PRz into the on-line state.

When a response (CKNG) indicating that the printing is not possible is received from at least one of the printers PR1 through PRz in response to the inquiry from the tandem control unit 2, the tandem control unit 2 does not issue the print start instruction (SWOK) with respect to the printers PR1 through PRz, and the printers PR1 through PRz are thus not put into the on-line state. In this case, the printer which cannot start the printing notifies or displays the cause thereof, while the other printers receive information related to the cause from the tandem control unit 2 and notify or display that a problem was generated in the printer which cannot start the printing.

The print start instruction may be issued in response to the pushing of the start switch or issued by other means. For example, the print start instruction may also be made by a command from a program of the printer with respect to the tandem control unit 2, a command from the host unit 1 with respect to the tandem control unit 2, or the like.

Instructions other than the print start instruction, such as instructions which require synchronous state transitions among the printers PR1 through PRz in response to switches or commands, may similarly be made via the tandem control unit 2. In order to simplify the construction of the tandem control unit 2, the tandem control unit 2 may be constructed to control only the synchronization of the printers PR1 through PRz. In this case, a part related to exchanging the commands/status with the host unit 1 may be omitted from the tandem control unit 2. Accordingly, a part surrounded by a dotted line within the tandem control unit 2 shown in FIG. 2 may be omitted in this case.

Of the printers PR1 through PRz which assume the on-line state, it is possible to instruct a non-printing transport mode with respect to the printer which simply needs to transport the continuous recording sheet 17 in synchronism with the other printers and does not carry out actual printing, page mark number printing and page mark number collating. The printer which is instructed to assume the non-printing transport mode can receive the print data, the page mark number and the like from the host unit 1, but does not carry out the printing, and thus, it is basically sufficient to receive only the one-page length (hereinafter referred to as a FCB length) of the print data with respect to the paper transport direction. The non-printing transport mode may be instructed with respect to one or a plurality of printers of the printers PR1 through PRz. The non-printing transport mode may be instructed by selecting whether to start the printer in a normal printing mode or the non-printing transport mode when turning ON the power of the printer, depending on a parameter set within the tandem control unit 2 or within the printer. In addition, the mode of the printer may be switched responsive to a command directly from the host unit 1 or a command from the host unit 1 received via the tandem control unit 2, even after the printer is started.

As described above, the printers PR1 through PRz in the on-line state can receive the print data from the host unit 1. The print data is distributed by the host unit 1, and with respect to the page at the same position on the same side of the continuous recording sheet 17 or the page at the same position on the opposite side of the continuous recording sheet 17 to be printed on the printers PR1 through PRz, the host unit 1 transfers the individual print data with respect to each of the printers PR1 through PRz by adding the same page mark number. Immediately after the automatic loading, paper transport and the like which do not carry out the actual printing are carried out, the printers PR1 through PRz are in an asynchronous state. The synchronous state refers to a state among a plurality of printers of the printers PR1 through PRz which are connected by the tandem-connection, such as between a printer PRi and a printer provided in the stage preceding the printer PRi or, among all of the printers PR1 through PRz, but excluding the printer which is instructed to assume the non-printing transport mode. The FCB length of the print data with respect to the paper transport direction is the same for all of the printers PR1 through PRz, including the printer which is instructed to assume the non-printing transport mode. Accordingly, with the exception of the printer which is instructed to assume the non-printing transport mode, the printers PR1 through PRz are in the synchronous state if the page which is printed by a printer in the preceding stage is transported to the position where the printing is to be carried out by a printer in the subsequent stage, and when the printing is carried out in the printer in the subsequent stage, the page mark numbers are the same and the printing page positions are the same on the same side or on the opposite sides of the continuous recording sheet 17. Otherwise, the printers PR1 through PRz are in the asynchronous state. The printer which is instructed to assume the non-printing transport mode does not need to make a transition to the synchronous state.

The printers PR1 through PRz which receive the print data and the page mark number data from the host unit 1 successively develop the received data in a printing memory (not shown) within the respective controllers 11, for example, and instruct printing preparations with respect to the corresponding mechanical controller 12 at the time when the printing preparations for one page are made. In a case where one printer is capable of printing on both sides of the continuous recording sheet 17, the printing preparations are instructed at the time when the printing preparations for one page are made with respect to each of the two sides of the continuous recording sheet 17. The controller 11 issues a print enable request with respect to the tandem control unit 2 after waiting for a printing preparations complete report from the mechanical controller 12. The printer which is instructed to assume the non-printing transport mode also issues a request similar to the above with respect to the mechanical controller 12 and the tandem control unit 2, but in this case, only the paper transport is instructed depending on the FCB length.

Basically, the tandem control unit 2 supplies a print enable instruction to each of the printers PR1 through PRz at the time when the print enable requests are received from all of the printers PR1 through PRz. However, the tandem control unit 2 may supply the print enable instruction to each of the printers PR1 through PRz even when the print enable requests are not received from all of the printers PR1 through PRz, depending on an extent of tolerance of paper buffering quantities among the printers PR1 through PRz, that is, an amount of slack of the continuous recording sheet 17 between two adjacent printers due to a preceding paper transport by the printer in the preceding stage, and/or an amount of tension on the continuous recording sheet 17 between two adjacent printers due to a preceding paper transport by the printer in the subsequent stage.

In the printer PR1 which receives the print enable instruction, the normal print data and the page mark number data, such as the data of the page mark number 001, are transferred to the mechanical controller 12 within the printer PR1 to instruct the printing. The printers PR2 through PRz operate in the asynchronous state until a transition is made to the synchronous state, and thus, a blank printing instruction is made with respect to the mechanical controller 12 of each of the printers PR2 through PRz, in a state where the page data added with the page mark number 001 is held. In this case, the blank printing instruction is also made with respect to the printer which is instructed to assume the non-printing transport mode. In the printers PR2 through PRz including the printer which is instructed to assume the non-printing transport mode, the FCB length for the blank printing is instructed from the host unit 1, and is the same as the FCB length for the normal printing. The printer PR1 continues the normal printing based on the print enable instruction from the tandem control unit 2, regardless of the synchronous or asynchronous state thereof, while the printers PR2 through PRz continue the blank printing by holding the page data added with the page mark number 001 until the page mark number 001 is detected.

When the desired page mark number 001 is detected in the printers PR2 through PRz, the printers PR2 through PRz temporarily stop the paper transport. The page mark number 001 can be detected by a known method using the mark sensor 18 shown in FIG. 1. The printer PRi (i=2, . . . , z) which detects the page mark number 001 transports the continuous recording sheet 17 to an appropriate position so as to print the page data added with the page mark number 001 to the same page position and the same side or, the same page position but the opposite side, as those printed by the printer PRi-1 in the-preceding stage. When the paper transport which does not involve actual printing is made after the automatic loading or the like, there is no guarantee that the paper length between the adjacent printers is set to an integer multiple of the FCB length with which the actual printing is made. For this reason, the above described transport of the continuous recording sheet 17 to the appropriate position is necessary to control the paper length between the adjacent printers to the integer multiple of the FCB length. As a result, the printer PRi makes a transition from the asynchronous state to the synchronous state, and the printer PRi in the synchronous state thereafter carries out the normal printing. In addition, each printer which is located on the subsequent stages of the printer PRi and not instructed to assume the non-printing transport mode, similarly makes a transition to the synchronous state. In the following description, an operation of the printer which makes the transition from the asynchronous state to the synchronous state will also be referred to as a leading page alignment.

The printer PRi which temporarily makes the transition to the synchronous state detects the page mark number which is printed by the printer PRi-1 in the preceding stage for each page if necessary, and confirms and collates the position where the page mark number is printed. In addition, the printer PRi collates the detected page mark number with the page mark number which is to be printed or has been printed by the printer PRi, and if a printing position error or a mismatch of the page mark numbers occurs as a result of this collating, it is judged that an error is generated and a transition is made to the asynchronous state. The printer which is instructed to assume the non-printing transport mode does not carry out actual printing and detection and collating of the page mark number, and synchronizes only the paper transport with the other printers depending on the FCB length.

The ejection of the continuous recording sheet 17 is instructed by switches (not shown) of the printers PR1 through PRz, commands from the host unit 1, commands from the host unit 1 with respect to the tandem control unit 2, and the like. Since the printers PR1 through PRz must carry out ejection in synchronism with each other, a synchronous timing control and the like related to the paper ejection is carried out via the tandem control unit 2, similarly as in the case of the print start instruction. Depending on the mode and state at the time when a paper eject instruction is received, each of the printers PR1 through PRz judges an amount of the continuous recording sheet 17 be ejected by the paper ejection. When the paper eject instruction is made in a state where the page which is to be guaranteed and is printed by the printers PR1 through PRz is ejected from the printer PRz or is accommodated by the paper stacking unit 16 of the printer PRz, the printers PR1 through PRz carry out the paper ejection in synchronism with each other while carrying out the fixing process by the respective fixing units 15, until a page corresponding to a transfer complete position on the continuous recording sheet 17 printed by the image forming unit 14 of the printer PR1 is ejected from the printer PRz or is accommodated by the paper stacking unit 16 of the printer PRz. The paper ejection can be stopped by a stop instruction or the like while the paper ejection is being made by the printers PRi through PRz.

In a case where the printer PR1 is the only printer not instructed to assume the non-printing transport mode and the other printers PR2 through PRz are instructed to assume the non-printing transport mode during a synchronous printing, the printer PR1 carries out the paper ejection in synchronism with the printers PR2 through PRz while carrying out the fixing process by the fixing unit 15 of the printer PR1, until a page corresponding to the transfer complete position on the continuous recording sheet 17 printed by the image forming unit 14 of the printer PR1 is ejected from the printer PRz or is accommodated by the paper stacking unit 16 of the printer PRz. In this case, the printers PR2 through PRz which are instructed to assume the non-printing transport mode carry out the blank printing.

When a stop instruction is issued from the tandem control unit 2 so that the printers PR1 through PRz in the synchronous state assume an off-line state with respect to the host unit 1 in a state where at least one of the printers PR1 through PRz has not completed printing of all of the print data of one job, each of the printers PR1 through PRz which assumes the off-line state can then be instructed to carry out a paper transport such as paper ejection, paper forwarding or reversing, and page feed (one-page paper transport). When such a paper transport instruction is executed at each of the printers PR1 through PRz, it no longer becomes possible to guarantee the synchronous state of the same page mark number with respect to the page at the same position on the same side or the page at the same position on the opposite side. Accordingly, with respect to the printer which receives such a paper transport instruction, it is possible for example to carry out one of following operations (A), (B) and (C). According to the operation (A), the paper transport instruction is cancelled. According to the operation (B), the paper transport instruction is executed by dumping data which are not yet printed and are held within the printers PR1 through PRz. In addition, according to the operation (C), a message which urges the user to carry out the synchronous printing by the printers PR1 through PRz until the page added with the same page mark number as that printed by the printer PR1 is printed by the printer PRz, is notified to or is displayed on the printer which received the paper transport instruction.

When the user selects the operation (A), the paper transport instruction is not executed, and the printers PR1 through PRz return to the off-line state, to thereby secure the synchronous state.

On the other hand, when the user selects the operation (B), the data held within the printers PR1 through PRz are dumped, the instruction contents of the paper transport instruction are executed, and the printers PR1 through PRz thereafter assume the asynchronous state. In this case, if the paper transport instruction is the paper eject instruction, the paper ejection is carried out until the last page printed by the printer PR1 is ejected from the printer PRz or is accommodated by the paper stacking unit 16 of the printer PRz.

In addition, when the user selects the operation (C), the page mark number of the last page printed by the printer PR1 is notified to the printers PR2 through PRz via the tandem control unit 2, and the printer PRz receives and prints the data up to the same page mark number as the printer PR1. During this time, the printers PR1 through PRz-1 carry out the blank printing in synchronism with each other.

Therefore, by the above described operations of this embodiment, it becomes possible to easily realize a duplex printing on both sides of the continuous recording sheet, a spot color printing on both sides of the continuous recording sheet, an accent color printing on the continuous recording sheet, a multi-color printing on the continuous recording sheet, and the like.

Further, the present invention is not limited to these embodiments, but various variations and modifications may be made without departing from the scope of the present invention.

What is claimed is:

1. A print control method for a tandem printing system comprising:
   supplying from a host unit print data to a plurality of printers which are connected serially to each adjacent printer by a tandem-connection,
   printing from said plurality of printers wherein each printer is connected to a single tandem control unit that controls printing operations in the tandem printing system in response to the supplying of print data from the host unit,
   controlling synchronous operations of the plurality of printers by the tandem control unit which is operable independently of the host unit and is provided independently of the host unit and is provided independently of the plurality of printers.

2. The print control method as claimed in claim 1, further comprising:
   (b) exchanging commands and/or status of the plurality of printers with the host unit by the tandem control unit.

3. The print control method as claimed in claim 1, further comprising:
   (b) controlling the plurality of printers to carry out automatic loading of a continuous recording sheet in synchronism with each other by the tandem control unit.

4. The print control method as claimed in claim 1, further comprising:
   (b) setting a non-printing transport mode in which no printing is carried out and only transport of a continuous recording sheet is made, with respect to one or a plurality of arbitrary printers of the plurality of printers.

5. The print control method as claimed in claim 2, further comprising:
   (c) controlling the plurality of printers to carry out automatic loading of a continuous recording sheet in synchronism with each other by the tandem control unit.

6. The print control method as claimed in claim 5, further comprising:
   (d) setting a non-printing transport mode in which no printing is carried out and only transport of the continuous recording sheet is made, with respect to one or a plurality of arbitrary printers of the plurality of printers.

7. The print control method as claimed in claim 2, further comprising:
   (c) setting a non-printing transport mode in which no printing is carried out and only transport of a continuous recording sheet is made, with respect to one or a plurality of arbitrary printers of the plurality of printers.

8. A tandem printing system comprising:
   a plurality of printers connected serially to each adjacent printer by a tandem-connection and printing print data with respect to a continuous recording sheet;
   a host unit supplying the print data to the plurality of printers;
   and a single tandem control unit that controls printing operations in the tandem printing system, operable independently of the host unit and provided independently of the host unit and provided independently of the plurality of printers, said tandem control unit controlling synchronous operations of the plurality of printers in response to the supplying of print data from the host unit.

9. The tandem printing system as claimed in claim 8, wherein said tandem control unit further includes means for exchanging commands and/or status of the plurality of printers with the host unit.

10. The tandem printing system as claimed in claim 8, wherein said tandem control unit further includes means for controlling the plurality of printers to carry out automatic loading of the continuous recording sheet in synchronism with each other.

11. The tandem printing system as claimed in claim 8, wherein said tandem control unit further includes means for setting a non-printing transport mode in which no printing is carried out and only transport of the continuous recording sheet is made, with respect to one or a plurality of arbitrary printers of the plurality of printers.

12. The tandem printing system as claimed in claim 9, wherein said tandem control unit further includes means for controlling the plurality of printers to carry out automatic loading of the continuous recording sheet in synchronism with each other.

13. The tandem printing system as claimed in claim 12, wherein said tandem control unit further includes means for setting a non-printing transport mode in which no printing is carried out and only transport of the continuous recording sheet is made, with respect to one or a plurality of arbitrary printers of the plurality of printers.

14. The tandem printing system as claimed in claim 9, wherein said tandem control unit further includes means for setting a non-printing transport mode in which no printing is carried out and only transport of the continuous recording sheet is made, with respect to one or a plurality of arbitrary printers of the plurality of printers.

15. The print control method as claimed in claim 1, further comprising:

(e) controlling errors generated in the plurality of printers by the tandem control unit.

16. The print control method as claimed in claim 15, wherein the error controlling further comprises:
monitoring errors generated in the plurality of printers:
recording the errors in the tandem control unit; and
notifying the plurality of printers of the error information for synchronous operations thereof.

17. The print control method as claimed in claim 1, further comprising:

(f) controlling switches of the plurality of printers, by the tandem control unit.

18. The print control method as claimed in claim 17, wherein the switch controlling further comprises:
monitoring switches of the plurality of printers which are pushed;
determining priority order among the pushed switches; and
instructing operations which are indicated by the pushed switches in the determined priority order.

19. The tandem printing system as claimed in claim 8, wherein the tandem control unit further comprises:
an error controller that controls errors generated in the plurality of printers, the error controller monitoring and recording the errors and notifying the plurality of printers of the error information for synchronous operations thereof.

20. The tandem printing system as claimed in claim 8, wherein the tandem control unit further comprises:
a switch controller that controls switches of the plurality of printers, the switch controller monitoring the switches which are pushed, determining priority order among the pushed switches, and instructing operations which are indicated by the pushed switches in the determined priority order.

* * * * *